US012785865B2

(12) United States Patent
Fu

(10) Patent No.: US 12,785,865 B2
(45) Date of Patent: Nov. 3, 2026

(54) HARQ-ACK CODEBOOK GENERATING METHOD, HARQ-ACK CODEBOOK RECEIVING METHOD, APPARATUS, DEVICE, AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 281 days.

(21) Appl. No.: 18/694,852

(22) PCT Filed: Sep. 29, 2021

(86) PCT No.: PCT/CN2021/121963
§ 371 (c)(1),
(2) Date: Mar. 22, 2024

(87) PCT Pub. No.: WO2023/050237
PCT Pub. Date: Apr. 6, 2023

(65) Prior Publication Data
US 2024/0396673 A1 Nov. 28, 2024

(51) Int. Cl.
*H04L 1/1829* (2023.01)
*H04L 1/1607* (2023.01)
*H04L 1/1825* (2023.01)

(52) U.S. Cl.
CPC .......... *H04L 1/1861* (2013.01); *H04L 1/1621* (2013.01); *H04L 1/1825* (2013.01); *H04L 1/1864* (2013.01)

(58) Field of Classification Search
CPC ... H04L 1/1861; H04L 1/1621; H04L 1/1825; H04L 1/1864
See application file for complete search history.

(56) References Cited

U.S. PATENT DOCUMENTS 11,470,676 B2 * 10/2022 Chen ..................... H04L 5/0096
12,021,633 B2 * 6/2024 Bae ....................... H04L 1/1861
(Continued)

FOREIGN PATENT DOCUMENTS

CN 109639398 A 4/2019
CN 111865512 A 10/2020
(Continued)

OTHER PUBLICATIONS

The First Office Action issued by the State Intellectual Property Office of People's Republic of China on May 29, 2025, in corresponding Application No. CN 202180002989.8, 19 pages.
(Continued)

*Primary Examiner* — Parth Patel
(74) *Attorney, Agent, or Firm* — Finnegan, Henderson, Farabow, Garrett & Dunner, L.L.P.

(57) ABSTRACT

A method for generating a Hybrid Automatic Repeat Request Acknowledgement (HARQ-ACK) codebook is performed by a user equipment (UE). The method includes: receiving first configuration information and second configuration information; generating, based on the first configuration information and the second configuration information, the HARQ-ACK codebook for feeding back a physical downlink shared channel (PDSCH); and sending the HARQ-ACK codebook to a network device; wherein the first configuration information indicates whether a multi-slot PDSCH transmission scheduled by a physical uplink control channel (PDCCH) is configured, and the second configuration information indicates whether a code block group (CBG) transmission is configured.

14 Claims, 6 Drawing Sheets

(56) References Cited

U.S. PATENT DOCUMENTS

| | | | | |
|---|---|---|---|---|
| 2019/0149271 | A1* | 5/2019 | Yin | H04L 1/1607 370/329 |
| 2019/0268803 | A1* | 8/2019 | He | H04W 28/04 |
| 2020/0084789 | A1* | 3/2020 | Wang | H04L 1/1614 |
| 2021/0159948 | A1* | 5/2021 | Li | H04L 1/1896 |
| 2021/0351876 | A1* | 11/2021 | Huang | H04L 1/1819 |
| 2021/0376988 | A1* | 12/2021 | Papasakellariou | H04L 5/001 |
| 2022/0045801 | A1* | 2/2022 | Wang | H04W 72/56 |
| 2022/0052790 | A1* | 2/2022 | Lei | H04L 5/0053 |
| 2022/0201726 | A1* | 6/2022 | Papasakellariou | H04W 72/1273 |
| 2022/0231795 | A1* | 7/2022 | Lei | H04L 1/1812 |
| 2022/0248436 | A1* | 8/2022 | Zhang | H04W 72/1273 |
| 2022/0329366 | A1* | 10/2022 | Kim | H04L 5/0055 |
| 2022/0346104 | A1* | 10/2022 | Yi | H04L 1/1854 |
| 2022/0368475 | A1* | 11/2022 | Lei | H04L 1/1822 |
| 2023/0198683 | A1* | 6/2023 | Gao | H04W 72/1273 370/280 |
| 2023/0232411 | A1* | 7/2023 | Zhang | H04L 5/0053 |
| 2023/0371039 | A1* | 11/2023 | Tsai | H04W 72/232 |
| 2023/0403717 | A1* | 12/2023 | Rastegardoost | H04W 72/232 |
| 2024/0032031 | A1* | 1/2024 | Yi | H04W 72/1273 |
| 2024/0048295 | A1* | 2/2024 | Choi | H04L 1/1893 |
| 2024/0056776 | A1* | 2/2024 | Elmali | H04L 5/0055 |
| 2024/0072975 | A1* | 2/2024 | Rastegardoost | H04W 72/20 |
| 2024/0137952 | A1* | 4/2024 | Li | H04W 72/232 |
| 2024/0163894 | A1* | 5/2024 | Xiong | H04L 1/1854 |
| 2024/0275529 | A1* | 8/2024 | Choi | H04L 1/1893 |
| 2024/0340896 | A1* | 10/2024 | Okano | H04W 72/1263 |
| 2024/0340899 | A1* | 10/2024 | Wang | H04L 1/1861 |
| 2024/0365337 | A1* | 10/2024 | Kim | H04W 72/232 |
| 2024/0396673 | A1* | 11/2024 | Fu | H04L 1/1861 |

FOREIGN PATENT DOCUMENTS

| | | | |
|---|---|---|---|
| CN | 111954307 | A | 11/2020 |
| CN | 112994855 | A | 6/2021 |

OTHER PUBLICATIONS

Extended European Search Report issued in Application No. 21958822.5 dated Oct. 24, 2024, 9 pages.

Intel Corporation, “Discussion on PDSCH/PUSCH”, 3GPP TSG RAN WG1 #106-e, R1-2107581, e-Meeting, Aug. 16-27, 2021, 23 pages.

Nokia, Nokia Shanghai Bell, “PDSCH/PUSCH enhancements”, f3GPP TSG RAN WG1 #106, R1-2107108, e-Meeting, Aug. 16-27, 2021, 32 pages.

Wilus Inc., “Discussion on multi-PDSCH/PUSCH scheduling for NR from 52.6GHz to 71GHz”, 3GPP TSG RAN WG1 #106-e, R1-2108150, e-Meeting, Aug. 16-27, 2021, 6 pages.

LG Electronics, PDSCH/PUSCH enhancements to support NR above 52.6 Ghz, 3GPP TSG RAN WG1 #106-e, R1-2107439, e-Meeting, Aug. 16-27, 2021, 26 pages.

International Search Report and Written Opinion of International Application No. PCT/CN2021/121963, dated Apr. 28, 2022, 14 pages.

* cited by examiner

HARQ-ACK CODEBOOK GENERATING METHOD, HARQ-ACK CODEBOOK RECEIVING METHOD, APPARATUS, DEVICE, AND STORAGE MEDIUM

CROSS-REFERENCE TO RELATED APPLICATION

This application is the US national phase application of International Application No. PCT/CN2021/121963, filed on Sep. 29, 2021, the content of which is hereby incorporated by reference in its entirety.

TECHNICAL FIELD

The disclosure relates to a field of wireless communication technologies, in particular to a method for generating a Hybrid Automatic Repeat Request Acknowledgement (HARQ-ACK) codebook, a method for receiving a HARQ-ACK codebook, apparatuses, devices and a storage medium.

BACKGROUND

The New Radio (NR) 52.6-71 GHz project has introduced multi-slot Physical Downlink Shared Channel (PDSCH) scheduling, that is, one downlink control information (DCI) schedules PDSCHs of multiple slots.

A method for feeding back a respective Hybrid Automatic Repeat Request Acknowledgement (HARQ-ACK) information for each Code Block Group (CBG) is called CBG-based HARQ-ACK feedback.

A Type2 HARQ-ACK codebook has a dynamic codebook size. When the DCI is used for scheduling PDSCHs, a Downlink Assignment Index (DAI) field in the DCI may be used for counting.

SUMMARY

According to a first aspect of embodiments of the disclosure, a method for generating a HARQ-ACK codebook, performed by a user equipment (UE), is provided. The method includes:

- receiving first configuration information and second configuration information;
- generating, based on the first configuration information and the second configuration information, the HARQ-ACK codebook for feeding back a physical downlink shared channel (PDSCH); and
- sending the HARQ-ACK codebook to a network device;
- in which the first configuration information indicates whether a multi-slot PDSCH transmission scheduled by a physical uplink control channel (PDCCH) is configured, and the second configuration information indicates whether a CBG transmission is configured.

According to a second aspect of embodiments of the disclosure, a method for receiving a Hybrid Automatic Repeat Request Acknowledgement (HARQ-ACK) codebook, performed by a network device, is provided. The method includes:

- sending first configuration information and second configuration information to a user equipment (UE); and
- receiving the HARQ-ACK codebook for feeding back a physical downlink shared channel (PDSCH) from the UE;
- in which the first configuration information indicates whether a multi-slot PDSCH transmission scheduled by a physical downlink control channel (PDCCH) is configured, and the second configuration information indicates whether a code block group (CBG) transmission is configured.

According to a third aspect of embodiments of the disclosure, a mobile terminal is provided. The mobile terminal includes:

- a processor; and
- a memory for storing instructions executable by the processor;
- in which the processor is configured to:
- receive first configuration information and second configuration information;
- generate, based on the first configuration information and the second configuration information, the HARQ-ACK codebook for feeding back a physical downlink shared channel (PDSCH); and
- send the HARQ-ACK codebook to a network device;
- in which the first configuration information indicates whether a multi-slot PDSCH transmission scheduled by a physical uplink control channel (PDCCH) is configured, and the second configuration information indicates whether a CBG transmission is configured.

BRIEF DESCRIPTION OF THE DRA WINGS

The drawings described here are used to provide a further understanding of embodiments of the disclosure and constitute a part of the disclosure. The schematic embodiments of the disclosure and the description thereof are used to explain embodiments of the disclosure and do not constitute an undue limitation of embodiments of the disclosure.

The accompanying drawings, which are incorporated in and constitute a part of this specification, illustrate embodiments consistent with the disclosure and together with the description serve to explain the principles of the disclosure.

DETAILED DESCRIPTION

Figure 1:
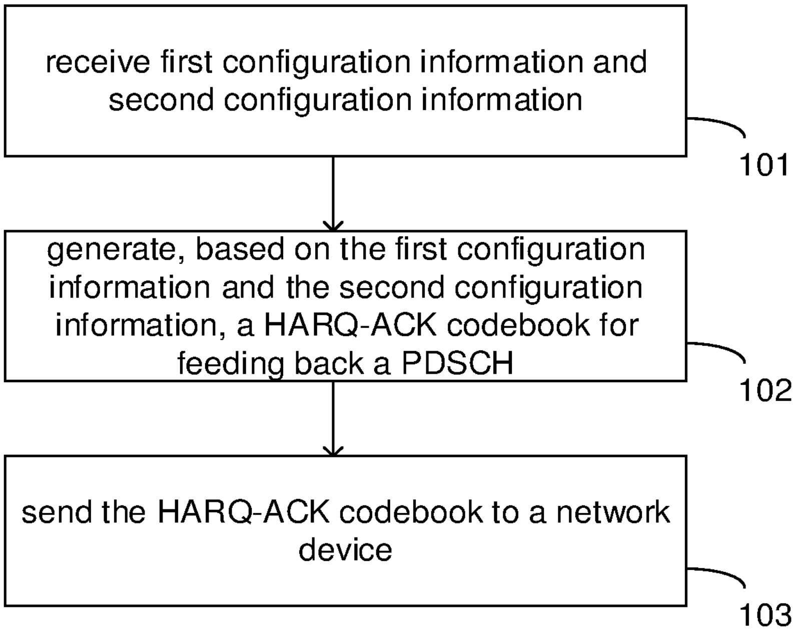
FIG. 1 is a flowchart illustrating a method for generating a Hybrid Automatic Repeat Request Acknowledgement (HARQ-ACK) codebook according to an embodiment.

Embodiments of the disclosure will be further described with reference to the accompanying drawings and specific implementations.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

It should be noted that an embodiment of the disclosure may include multiple steps. For convenience of description, these steps are numbered, but these numbers are not a limitation on slots between the steps, or the order of execution. The steps may be carried out in any order, which is not limited in embodiments of the disclosure.

The New Radio (NR) 52.6-71 GHz project has introduced multi-slot Physical Downlink Shared Channel (PDSCH) scheduling, that is, one downlink control information (DCI) schedules PDSCHs of multiple slots. A method for feeding back a respective Hybrid Automatic Repeat Request Acknowledgement (HARQ-ACK) information for each Code Block Group (CBG) is called CBG-based HARQ-ACK feedback. A Type2 HARQ-ACK codebook has a dynamic codebook size. When the DCI is used for scheduling PDSCHs, a Downlink Assignment Index (DAI) field in the DCI may be used for counting. Therefore, a method for creating the Type2 HARQ-ACK codebook when multiple cells in a Physical Uplink Control Channel (PUCCH) group are respectively configured with a multi-slot PDSCH transmission and/or a CBG transmission is needed.

Hybrid Automatic Repeat Request Acknowledgements (HARQ-ACKs) of multiple physical downlink shared channels (PDSCHs) scheduled by one downlink control information (DCI) are feedback on a same physical uplink control channel (PUCCH). A slot of the PUCCH for feeding back the HARQ-ACKs of the multiple PDSCHs is determined based on kl in the scheduling DCI and a slot position of a last PDSCH.

One Transport Block (TB) may be divided into one or more code blocks (CBs), and multiple CBs may be classified into several code block groups (CBGs). For example, one TB is divided into 8 CBs, and these 8 CBs are classified into 4 CBGs each containing 2 CBs. Therefore, if 1 bit of HARQ-ACK information is fed back for each CBG, a total of 4 bits of HARQ-ACK information need to be fed back. The use of CBG feedback may improve the efficiency of HARQ retransmission. That is, only the erroneous CBG need to be retransmitted instead of the entire TB. However, the HARQ-ACK overhead is increased accordingly.

When using the DCI for scheduling PDSCH(s), a downlink assignment index (DAI) field in the DCI is used for counting. The DAI includes a Counter DAI (C-DAI) and a Total-DAI (T-DAI). When a User Equipment (UE) is configured with only a single carrier, only the C-DAI needs to count. When the UE is configured with multiple carriers, both the C-DAI and the T-DAI need to count. In conclusions that have been agreed, the DAI counts based on the number of scheduled DCIs. That is, each time the network device schedules one DCI (the DCI may schedule one or more PDSCHs), the C-DAI is increased by 1, and the T-DAI is also added by 1 when multiple carriers are configured.

Embodiments of the disclosure provide a method for generating a HARQ-ACK codebook, which is performed by a UE. The method may be executed independently or in combination with any other embodiment of the disclosure. FIG. 1 is a flowchart illustrating a method for generating a HARQ-ACK codebook according to an embodiment. As illustrated in FIG. 1, the method includes the following.

At block 101, first configuration information and second configuration information are received.

At block 102, the HARQ-ACK codebook for feeding back PDSCH(s) is generated based on the first configuration information and the second configuration information.

At block 103, the HARQ-ACK codebook is sent to a network device.

The first configuration information indicates whether multi-slot PDSCH transmission scheduled by a PDCCH is configured, and the second configuration information indicates whether a CBG transmission is configured.

In an implementation, the UE receives the first configuration information and the second configuration information. The first configuration information indicates whether a multi-slot PDSCH transmission scheduled by the PDCCH is configured, and the second configuration information indicates whether a CBG transmission is configured. The UE generates the HARQ-ACK codebook for feeding back the PDSCH(s) based on the first configuration information and the second configuration information, and sends the HARQ-ACK codebook to the network device.

In an implementation, the UE generates a Type2 HARQ-ACK codebook for feeding back the PDSCH(s) based on the first configuration information and the second configuration information.

In an implementation, the UE receives the first configuration information and the second configuration information from the network device. Based on the first configuration information and the second configuration information, the UE determines a current transmission scenario or a current transmission scenario group, and determines a number of HARQ-ACK information bits corresponding to each DCI based on the current transmission scenario or the current transmission scenario group. Correspondingly, the UE generates the HARQ-ACK codebook and sends the HARQ-ACK codebook to the network device.

In the above implementations, the UE generates the HARQ-ACK codebook for feeding back the PDSCH(s) based on a configuration manner of the multi-slot PDSCH transmission scheduled by the PDCCH and a configuration manner of CBG transmission, so that the HARQ-ACK codebook is generated in a manner suitable for both of the configurations.

Figure 2:
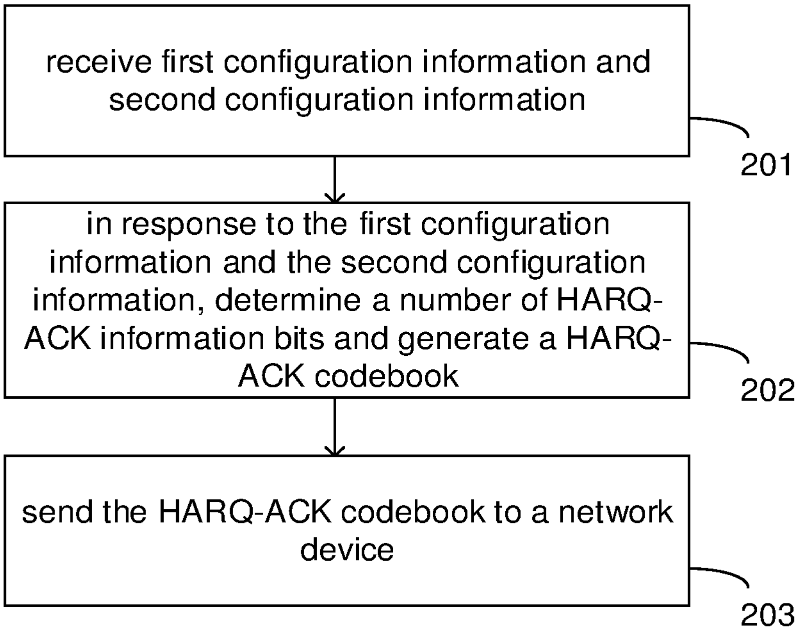
FIG. 2 is a flowchart illustrating a method for generating a HARQ-ACK codebook according to an embodiment.

Embodiment of the disclosure provide a method for generating a HARQ-ACK codebook, which is performed by a UE. The method may be executed independently or in combination with any other embodiment of the disclosure. FIG. 2 is a flowchart illustrating a method for generating a HARQ-ACK codebook according to an embodiment. As illustrated in FIG. 2, the method includes the following.

At block 201, first configuration information and second configuration information are received.

At block 202, in response to the first configuration information indicating that the multi-slot PDSCH transmission scheduled by the PDCCH is configured and the second configuration information indicating that the CBG transmission is configured, it is determined that a number of HARQ-ACK information bits corresponding to each DCI is a maximum value between M and N, and the HARQ-ACK codebook is generated based on the number of HARQ-ACK information bits.

At block 203, the HARQ-ACK codebook is sent to a network device.

The first configuration information indicates whether the multi-slot PDSCH transmission scheduled by a PDCCH is configured, and the second configuration information indicates whether the CBG transmission is configured.

M is a maximum number of CBGs included in one TB configured by the network device, N is a maximum number of PDSCHs corresponding to the multi-slot PDSCH transmission scheduled by the PDCCH, the maximum number of PDSCHs is a maximum number of PDSCHs scheduled by one DCI determined based on a configuration from the network device or a maximum number of PDSCHs scheduled by one DCI determined based on a protocol, in which M and N are both positive integers greater than 0.

In an implementation, the UE receives the first configuration information and the second configuration information, in which the first configuration information indicates that the multi-slot PDSCH transmission scheduled by the PDCCH is configured and the second configuration information indicates that the CBG transmission is configured. In response to the received first configuration information and second configuration information, the UE determines that the number of HARQ-ACK information bits corresponding to each DCI is the maximum value between M and N, generates the HARQ-ACK codebook based on the number of HARQ-ACK information bits, and sends the generated HARQ-ACK codebook, in which M is the maximum number of CBGs included in one TB configured by the network device and N is the maximum number of PDSCHs scheduled by one DCI determined based on the protocol.

In an implementation, the UE receives the first configuration information and the second configuration information, in which the first configuration information indicates that the multi-slot PDSCH transmission scheduled by the PDCCH is configured and the second configuration information indicates that the CBG transmission is configured. In response to the received first configuration information and second configuration information, the UE determines that the number of HARQ-ACK information bits corresponding to each DCI is the maximum value between M and N, generates the HARQ-ACK codebook based on the number of HARQ-ACK information bits, and sends the generated HARQ-ACK codebook, in which M is the maximum number of CBGs included in one TB configured by the network device, and N is the maximum number of PDSCHs scheduled by one DCI determined based on a configuration from the network device.

In an implementation, the UE receives the first configuration information and the second configuration information, in which the first configuration information indicates that the multi-slot PDSCH transmission scheduled by the PDCCH is configure and the second configuration information indicates that the CBG transmission is configured. In response to the received first configuration information and second configuration information, the UE determines that the number of HARQ-ACK information bits corresponding to each DCI is the maximum value between M and N, generates the HARQ-ACK codebook based on the number of HARQ-ACK information bits, and sends the generated HARQ-ACK codebook. M is the maximum number of CBGs included in one TB configured by the network device, and N is the maximum number of PDSCHs scheduled by one DCI indicated in a Time Domain Resource Allocation (TDRA) table sent by the network device via a Radio Resource Control (RRC) signaling.

In an implementation, the UE receives the scheduling DCI from the network device. The TDRA field in the DCI points to a certain row in the TDRA table, i.e., a certain TDRA element. When the TDRA element contains N {k0, mapping type, SLIV}, the DCI schedules N PDSCHs.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

For a cell configured with both the multi-slot PDSCH transmission and the CBG transmission, there may also be the following limitations. Only when the DCI schedules single-slot PDSCH, there will be a code block group transmission information (CBGTI) field. When the DCI schedules multi-slot PDSCH, there will be no CBGTI field. That is, the multi-slot PDSCH scheduled by the DCI will not be transmitted/retransmitted according to the CBG. Under these limitations, the maximum value between M and N is used as the number of HARQ-ACK information bits corresponding to the DCI, which may reduce the number of HARQ-ACK information bits in the scenario in which both the multi-slot PDSCH transmission and the CBG transmission are configured and improve the efficiency of feeding back the HARQ-ACK codebook.

Figure 3:
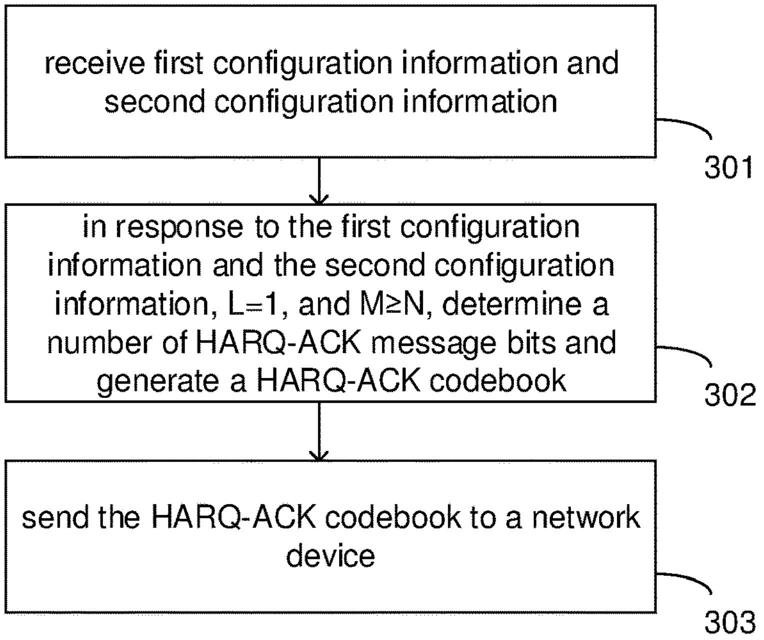
FIG. 3 is a flowchart illustrating a method for generating a HARQ-ACK codebook according to an embodiment.

Embodiments of the disclosure provide a method for generating a HARQ-ACK codebook, which is performed by a UE. The method may be executed independently or in combination with any other embodiment of the disclosure. FIG. 3 is a flowchart illustrating a method for generating a HARQ-ACK codebook according to an embodiment. As illustrated in FIG. 3, the method includes the following.

At block 301, first configuration information and second configuration information are received.

At block 302, in response to the first configuration information indicating that the multi-slot PDSCH transmission scheduled by the PDCCH is configured, the second configuration information indicating that the CBG transmission is configured, one DCI scheduling L PDSCHs, $L=1$, and $M \geq N$, it is determined that the HARQ-ACK information bits corresponding to the DCI includes M information bits corresponding to M CBGs of the PDSCH, and the HARQ-ACK codebook is generated based on the HARQ-ACK information bits.

At block 303, the HARQ-ACK codebook is sent to a network device.

The first configuration information indicates whether the multi-slot PDSCH transmission scheduled by a PDCCH is configured, and the second configuration information indicates whether the CBG transmission is configured.

M is a maximum number of CBGs included in one TB configured by the network device, N is a maximum number of PDSCHs corresponding to the multi-slot PDSCH transmission scheduled by the PDCCH, the maximum number of PDSCHs is a maximum number of PDSCHs scheduled by one DCI determined based on a configuration from the network device, or a maximum number of PDSCHs scheduled by one DCI determined based on a protocol, in which M and N are both positive integers greater than 0, and L is a positive integer greater than 0.

In an implementation, the UE receives the first configuration information and the second configuration information, in which the first configuration information indicates that the multi-slot PDSCH transmission scheduled by the PDCCH is configured, and the second configuration information indicates that the CBG transmission is configured. In response to the received first configuration information and the received second configuration information and in response to one DCI scheduling L PDSCHs, in which L=1 and M≥N, the HARQ-ACK information corresponding to the DCI includes M information bits corresponding to M CBGs of the PDSCH and the UE generates a HARQ-ACK codebook based on the M information bits and sends the generated HARQ-ACK codebook.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, for a cell configured with both the multi-slot PDSCH transmission and the CBG transmission, there may also be the following limitations. Only when the DCI schedules single-slot PDSCH, there will be a CBGTI field. When the DCI schedules multi-slot PDSCH, there will be no CBGTI field. That is, the multi-slot PDSCH scheduled by the DCI will not be transmitted/retransmitted according to CBG. Under these limitations, the maximum value between M and N is used as the number of HARQ-ACK information bits corresponding to the DCI, which may reduce the number of HARQ-ACK information bits in the scenario in which both the multi-slot PDSCH transmission and the CBG transmission are configured and improve the efficiency of feeding back the HARQ-ACK codebook.

Embodiments of the disclosure provide a method for generating a HARQ-ACK codebook, which is performed by a UE. The method may be executed independently or in combination with any other embodiment of the disclosure. The method includes the following:

receiving first configuration information and second configuration information;

in response to the first configuration information indicating that the multi-slot PDSCH transmission is scheduled by the PDCCH is configured and the second configuration information indicating that the CBG transmission is configured, and in response to one DCI scheduling L PDSCHs, L=1, and M<N, determining that the HARQ-ACK information bits corresponding to the DCI includes M information bits corresponding to M CBGs of the PDSCH and (N−M) stuffing bits, and generating the HARQ-ACK codebook based on the HARQ-ACK information bits, in which values of the (N−M) stuffing bits are identical; and sending the HARQ-ACK codebook to a network device.

The first configuration information indicates whether the multi-slot PDSCH transmission scheduled by a PDCCH is configured, and the second configuration information indicates whether the CBG transmission is configured.

Moreover, M is a maximum number of CBGs included in one TB configured by the network device, N is a maximum number of PDSCHs corresponding to the multi-slot PDSCH transmission scheduled by the PDCCH, the maximum number of PDSCHs is a maximum number of PDSCHs scheduled by one DCI determined based on a configuration from the network device or a maximum number of PDSCHs scheduled by one DCI determined based on a protocol, in which M and N are both positive integers greater than 0, and L is a positive integer greater than 0.

In an implementation, the UE receives the first configuration information and the second configuration information, in which the first configuration information indicates that the multi-slot PDSCH transmission scheduled by the PDCCH is configured and the second configuration information indicates that the CBG transmission is configured. In response to the received first configuration information and the received second configuration information and in response to one DCI scheduling L PDSCHs, L=1, and M<N, the HARQ-ACK information corresponding to the DCI includes M information bits corresponding to M CBGs of the PDSCH and (N−M) stuffing bits, in which values of the (N−M) stuffing bits are all 0 or 1, and the UE generates the HARQ-ACK codebook based on the M information bits and sends the generated HARQ-ACK codebook.

In an implementation, for example, for a certain cell, it is configured that M=4 and N=6, it is determined that the number of HARQ-ACK information bits corresponding to the DCI is the maximum value between M and N, i.e., 6. When one DCI schedules single-slot PDSCH, the HARQ-ACK information for the single-slot PDSCH is fed back in a manner according to the CBG, which is 4 bits. When all CBGs in the PDSCH are decoded correctly, 1 1 1 1 is fed back, and 2 bits are left as stuffing bits with the default value 0 0.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, for a cell configured with both the multi-slot PDSCH transmission and the CBG transmission, there may also be the following limitations. Only when the DCI schedules single-slot PDSCH, there will be a CBGTI domain. When the DCI schedules multi-slot PDSCH, there will be no CBGTI domain. That is, the multi-slot PDSCH scheduled by the DCI will not be transmitted/retransmitted according to CBG. Under these limitations, the maximum value between M and N is used as the number of HARQ-ACK information bits corresponding to the DCI, which may reduce the number of HARQ-ACK information bits in the scenario in which both the multi-slot PDSCH transmission and the CBG transmission are configured and improve the efficiency of feeding back the HARQ-ACK codebook.

Embodiments of the disclosure provide a method for generating a HARQ-ACK codebook, which is performed by a UE. The method may be executed independently or in combination with any other embodiment of the disclosure. The method includes the following:

receiving first configuration information and second configuration information;

in response to the first configuration information indicating that the multi-slot PDSCH transmission scheduled by the PDCCH is configured and the second configuration information indicating that the CBG transmission is configured, and in response to one DCI scheduling L PDSCHs, 1<L≤N, and M≥N, determining that the HARQ-ACK information bits corresponding to the DCI includes L information bits corresponding to the L PDSCHs and (M−L) stuffing bits, and generating the HARQ-ACK codebook based on the HARQ-ACK information bits, in which values of the (M−L) stuffing bits are identical; and sending the HARQ-ACK codebook to a network device.

The first configuration information indicates whether the multi-slot PDSCH transmission scheduled by a PDCCH is configured, and the second configuration information indicates whether the CBG transmission is configured.

Moreover, M is a maximum number of CBGs included in one TB configured by the network device, N is a maximum number of PDSCHs corresponding to the multi-slot PDSCH transmission scheduled by the PDCCH, the maximum number of PDSCHs is a maximum number of PDSCHs scheduled by one DCI determined based on a configuration from the network device or a maximum number of PDSCHs scheduled by one DCI determined based on a protocol, in which M and N are both positive integers greater than 0, and L is a positive integer greater than 0.

In an implementation, the UE receives the first configuration information and the second configuration information, in which the first configuration information indicates that multi-slot PDSCH transmission scheduled by the PDCCH is configured, and the second configuration information indicates that the CBG transmission is configured. In response to the received first configuration information and the received second configuration information and in response to one DCI scheduling L PDSCHs, $1<L\leq N$, and $M\geq N$, the HARQ-ACK information corresponding to the DCI includes L information bits corresponding to the L PDSCHs and (M−L) stuffing bits, in which values of the (M−L) stuffing bits are all 0 or 1, and the UE generates the HARQ-ACK codebook based on the N information bits and sends the generated HARQ-ACK codebook.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, for a cell configured with both the multi-slot PDSCH transmission and the CBG transmission, there may also be the following limitations. Only when the DCI schedules single-slot PDSCH, there will be a CBGTI domain. When the DCI schedules multi-slot PDSCH, there will be no CBGTI domain. That is, the multi-slot PDSCH scheduled by the DCI will not be transmitted/retransmitted in accordance with the CBG. Under these limitations, the maximum value between M and N is used as the number of HARQ-ACK information bits corresponding to the DCI, which may reduce the number of HARQ-ACK information bits in the scenario in which both the multi-slot PDSCH transmission and the CBG transmission are configured and improve the efficiency of feeding back the HARQ-ACK codebook.

Embodiments of the disclosure provide a method for generating a HARQ-ACK codebook, which is performed by a UE. The method may be executed independently or in combination with any other embodiment of the disclosure. The method includes the following:

- receiving first configuration information and second configuration information;
- in response to the first configuration information indicating that the multi-slot PDSCH transmission scheduled by the PDCCH is configured, and the second configuration information indicating that the CBG transmission is configured, and in response to one DCI scheduling L PDSCHs, $1<L\leq N$, and $M\geq N$, determining that the HARQ-ACK information bits corresponding to the DCI includes L information bits corresponding to the L PDSCHs and (N−L) stuffing bits, and generating the HARQ-ACK codebook based on the HARQ-ACK information bits, in which values of the (N−L) stuffing bits are identical; and
- sending the HARQ-ACK codebook to a network device.

The first configuration information indicates whether the multi-slot PDSCH transmission scheduled by a PDCCH is configured, and the second configuration information indicates whether the CBG transmission is configured.

Moreover, M is a maximum number of CBGs included in one TB configured by the network device, N is a maximum number of PDSCHs corresponding to the multi-slot PDSCH transmission scheduled by the PDCCH, the maximum number of PDSCHs is a maximum number of PDSCHs scheduled by one DCI determined based on a configuration from the network device or a maximum number of PDSCHs scheduled by one DCI determined based on a protocol, in which M and N are both positive integers greater than 0, and L is a positive integer greater than 0.

In an implementation, the UE receives the first configuration information and the second configuration information, in which the first configuration information indicates that the multi-slot PDSCH transmission scheduled by the PDCCH is configured and the second configuration information indicates that the CBG transmission is configured. In response to the received first configuration information and the received second configuration information and in response to one DCI scheduling L PDSCHs, $1<L\leq N$, and $M<N$, the HARQ-ACK information corresponding to the DCI includes L information bits corresponding to the L PDSCHs and (N−L) stuffing bits, in which values of the (N−L) stuffing bits are all 0 or 1, and the UE generates the HARQ-ACK codebook based on the N information bits and sends the generated HARQ-ACK codebook.

In an implementation, for example, for a certain cell, it is configured that M=4 and N=6, it is determined that the number of HARQ-ACK information bits corresponding to the DCI is the maximum value between M and N, i.e., 6. When the DCI schedules 5 PDSCHs, the HARQ-ACK information for the multi-slot PDSCH is not fed back in accordance with the CBG, but directly fed back at a TB level. One PDSCH corresponds to 1 bit, and 5 PDSCHs correspond to 5 bits. When all 5 PDSCHs are decoded correctly, 1 1 1 1 1 is fed back, and 1 bit is left as the stuffing bit whose value is 0 by default.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, for a cell configured with both the multi-slot PDSCH transmission and the CBG transmission, there may also be the following limitations. Only when the DCI schedules single-slot PDSCH, there will be a CBGTI domain. When the DCI schedules multi-slot PDSCH, there will be no CBGTI domain. That is, the multi-slot PDSCH scheduled by the DCI will not be transmitted/retransmitted in accordance with the CBG. Under these limitations, the maximum value between M and N is used as the number of HARQ-ACK information bits corresponding to the DCI, which may reduce the number of HARQ-ACK information bits in the scenario in which both the multi-slot PDSCH transmission and the CBG transmission are configured and improve the efficiency of feeding back the HARQ-ACK codebook.

Figure 4:
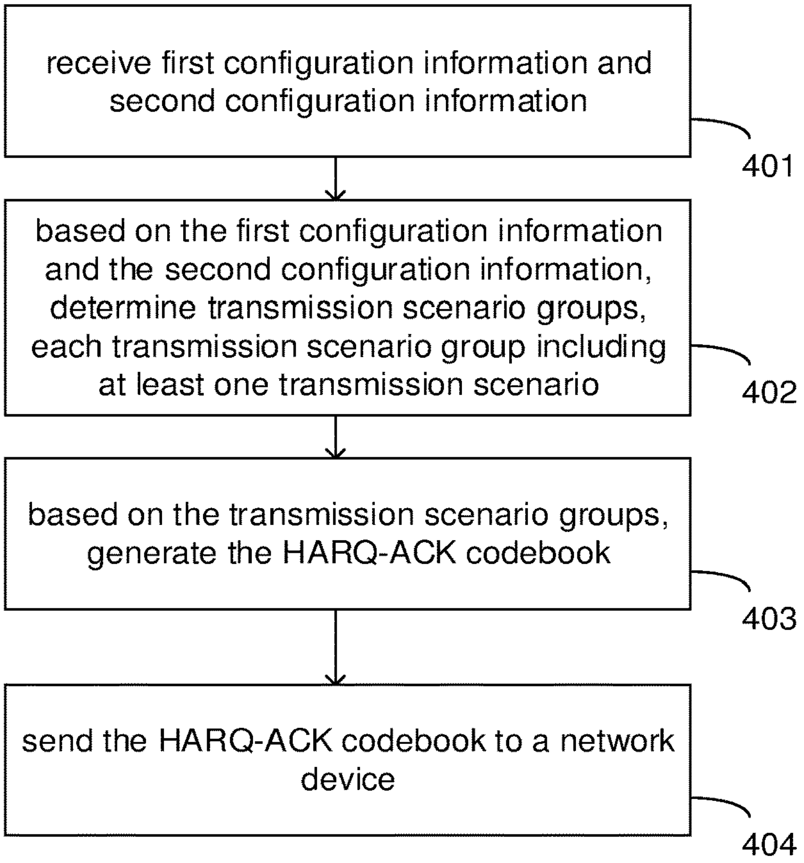
FIG. 4 is a flowchart illustrating a method for generating a HARQ-ACK codebook according to an embodiment.

Embodiments of the disclosure provide a method for generating a HARQ-ACK codebook, which is performed by a UE. The method may be executed independently or in combination with any other embodiment of the disclosure. FIG. 4 is a flowchart illustrating a method for generating a HARQ-ACK codebook according to an embodiment. As illustrated in FIG. 4, the method includes the following.

At block 401, first configuration information and second configuration information are received.

At block 402, transmission scenario groups are determined based on the first configuration information and the second configuration information, in which each group includes at least one transmission scenario.

At block 403, the HARQ-ACK codebook is generated based on the transmission scenario groups.

At block 404, the HARQ-ACK codebook is sent to a network device.

The first configuration information indicates whether the multi-slot PDSCH transmission scheduled by a PDCCH is configured, and the second configuration information indicates whether the CBG transmission is configured.

In an implementation, the UUE receives the first configuration information and the second configuration information, determines the transmission scenario groups based on the first configuration information and the second configuration information, generates the HARQ-ACK codebook based on the transmission scenario groups and sends the HARQ-ACK codebook to the network device.

There are 4 kinds of transmission scenarios based on information on whether the multi-slot PDSCH transmission scheduled by a PDCCH is configured and information on whether the CBG transmission is configured, i.e., a transmission scenario in which the multi-slot PDSCH transmission scheduled by the PDCCH is not configured and the CBG transmission is not configured; a transmission scenario in which the multi-slot PDSCH transmission scheduled by the PDCCH is not configured and the CBG transmission is configured, a transmission scenario in which the multi-slot PDSCH transmission scheduled by the PDCCH is configured and the CBG transmission is not configured, and a transmission scenario in which the multi-slot PDSCH transmission scheduled by the PDCCH is configured and the CBG transmission is configured.

One transmission scenario group includes at least one transmission scenario. For example, based on the a method for classifying transmission scenarios, a first transmission scenario and a second transmission scenario are classified into a transmission scenario group, and a third transmission scenario and a fourth transmission scenario are classified into another transmission scenario group. For example, based on another method for classifying transmission scenarios, the first transmission scenario and the third transmission scenario are classified into a transmission scenario group, and the second transmission scenario and the fourth transmission scenario are classified into another transmission scenario group.

The first transmission scenario is a transmission scenario in which the multi-slot PDSCH transmission scheduled by the PDCCH is not configured and the CBG transmission is not configured. The second transmission scenario is a transmission scenario in which the multi-slot PDSCH transmission scheduled by the PDCCH is not configured and the CBG transmission is configured. The third transmission scenario is a transmission scenario in which the multi-slot PDSCH transmission scheduled by the PDCCH is configured and the CBG transmission is not configured. The fourth transmission scenario is a transmission scenario in which the multi-slot PDSCH transmission scheduled by the PDCCH is configured and the CBG transmission is configured.

In an implementation, the UE receives the first configuration information and the second configuration information, determines the transmission scenario groups based on the first configuration information and the second configuration information, determines the number of HARQ-ACK information bits corresponding to each DCI for cells belonging to the same transmission scenario group, generates the HARQ-ACK codebook based on the number of HARQ-ACK information bits and sends the HARQ-ACK codebook to the network device.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, generating the HARQ-ACK codebook based on the transmission scenario groups may reduce the number of HARQ-ACK information bits and improve the efficiency of feeding back the HARQ-ACK codebook.

Figure 5:
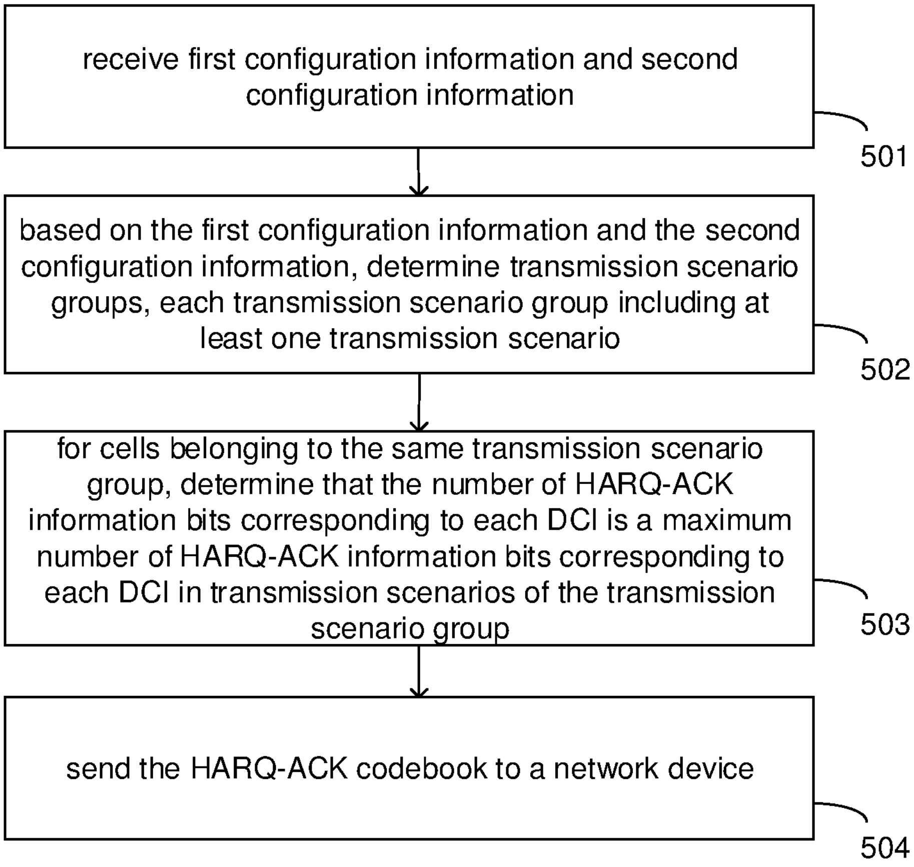
FIG. 5 is a flowchart illustrating a method for generating a HARQ-ACK codebook according to an embodiment.

Embodiment of the disclosure provide a method for generating a HARQ-ACK codebook, which is performed by a UE. The method may be executed independently or in combination with any other embodiment of the disclosure. FIG. 5 is a flowchart illustrating a method for generating a HARQ-ACK codebook according to an embodiment. As illustrated in FIG. 5, the method includes the following.

At block 501, first configuration information and second configuration information are received.

At block 502, transmission scenario groups are determined based on the first configuration information and the second configuration information, in which each group includes at least one transmission scenario.

At block 503, for cells belonging to the same transmission scenario group, it is determined that the number of HARQ-ACK information bits corresponding to each DCI is a maximum number of HARQ-ACK information bits corresponding to each DCI in transmission scenarios of the transmission scenario group.

At block 504, the HARQ-ACK codebook is sent to a network device.

The first configuration information indicates whether the multi-slot PDSCH transmission scheduled by a PDCCH is configured, and the second configuration information indicates whether the CBG transmission is configured.

In an implementation, the UE receives the first configuration information and the second configuration information, and determines the transmission scenario groups based on the first configuration information and the second configuration information. For cells belonging to the same transmission scenario group, the UE determines that the number of HARQ-ACK information bits corresponding to each DCI is the maximum number of HARQ-ACK information bits corresponding to each DCI in transmission scenarios of the transmission scenario group. Moreover, the UE generates the HARQ-ACK codebook and sends the HARQ-ACK codebook to the network device.

In an implementation, the transmission scenario group includes: a transmission scenario in which the multi-slot PDSCH scheduled by the PDCCH is configured and the CBG transmission is not configured, and a transmission scenario in which the multi-slot PDSCH scheduled by the PDCCH is not configured and the CBG transmission s configured. In the transmission scenario in which the multi-slot PDSCH scheduled by the PDCCH is configured and the CBG transmission is not configured, the number of HARQ-ACK information bits corresponding to each DCI is 1. In the transmission scenario in which the multi-slot PDSCH scheduled by the PDCCH is not configured and the CBG transmission is configured, the number of HARQ-ACK information bits corresponding to each DCI is the maximum number of CBGs included in one TB configured by the network device, e.g., 4. For cells belonging to the transmission scenario group, it is determined that the number of HARQ-ACK information bits corresponding to each DCI is 4.

In an implementation, the transmission scenario group includes a transmission scenario in which the multi-slot PDSCH transmission scheduled by the PDCCH is configured and the CBG transmission is not configured and a transmission scenario in which the multi-slot PDSCH scheduled by the PDCCH is configured and the CBG transmission is configured. In the transmission scenario in which the multi-slot PDSCH transmission scheduled by the PDCCH is configured and the CBG transmission is not configured, the number of HARQ-ACK information bits corresponding to each DCI is a number of multi-slot PDSCHs indicated in the TDRA table, e.g., 6. In the transmission scenario in which the multi-slot PDSCH scheduled by the PDCCH is configured and the CBG transmission is configured, the number of HARQ-ACK information bits corresponding to each DCI is M*N, e.g., 24, in which M is the maximum number of CBGs included in one TB configured by the network device, i.e., 4, and N is the number of multi-slot PDSCHs indicated in the TDRA table, i.e., 6. For cells belonging to the transmission scenario group, it is determined that the number of HARQ-ACK information bits corresponding to each DCI is 24.

In an implementation, the transmission scenario group includes a transmission scenario in which the multi-slot PDSCH transmission scheduled by the PDCCH is configured and the CGB transmission is not configured and a transmission scenario in which the multi-slot PDSCH transmission scheduled by the PDCCH is configured and the CBG transmission is configured. In the transmission scenario in which the multi-slot PDSCH transmission scheduled by the PDCCH is configured and the CBG transmission is not configured, the number of HARQ-ACK information bits corresponding to each DCI is a number of multi-slot PDSCHs indicated in the TDRA table, e.g., 6. In the transmission scenario in which the multi-slot PDSCH transmission scheduled by the PDCCH is configured and the CBG transmission is configured, the number of HARQ-ACK information bits corresponding to each DCI is a maximum value between M and N, e.g., 6, in which M is the maximum number of CBGs included in one TB configured by the network device, i.e., 4, and N is the number of multi-slot PDSCHs indicated in the TDRA table, i.e., 6. For cells belonging to the transmission scenario group, it is determined that the number of HARQ-ACK information bits corresponding to each DCI is 6.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, generating the HARQ-ACK codebook based on the transmission scenario groups may reduce the number of HARQ-ACK information bits and improve the efficiency of feeding back the HARQ-ACK codebook.

Embodiments of the disclosure provide a method for generating a HARQ-ACK codebook, which is performed by a UE. The method may be executed independently or in combination with any other embodiment of the disclosure. The transmission scenarios includes: a first transmission scenario, a second transmission scenario, a third transmission scenario, and a fourth transmission scenario. The first transmission scenario is a transmission scenario in which the multi-slot PDSCH transmission scheduled by the PDCCH is not configured and the CBG transmission is not configured. The second transmission scenario is a transmission scenario in which the multi-slot PDSCH transmission scheduled by the PDCCH is not configured and the CBG transmission is configured. The third transmission scenario is a transmission scenario in which the multi-slot PDSCH transmission scheduled by the PDCCH is configured and the CBG transmission is not configured. The fourth transmission scenario is a transmission scenario in which the multi-slot PDSCH transmission scheduled by the PDCCH is configured and the CBG transmission is configured.

The number of HARQ-ACK information bits corresponding to each DCI in the first transmission scenario is 1.

The number of HARQ-ACK information bits corresponding to each DCI in the second transmission scenario is M.

The number of HARQ-ACK information bits corresponding to each DCI in the third transmission scenario is N.

The number of HARQ-ACK information bits corresponding to each DCI in the fourth transmission scenario is M*N or a maximum value between M and N.

M is a maximum number of CBGs included in one TB configured by the network device, N is a maximum number of PDSCHs corresponding to the multi-slot PDSCH transmission scheduled by the PDCCH, the maximum number of PDSCHs is a maximum number of PDSCHs scheduled by one DCI determined based on a configuration from the network device or a maximum number of PDSCHs scheduled by one DCI determined based on a protocol, and M and N are both positive integers greater than 0.

Figure 6:
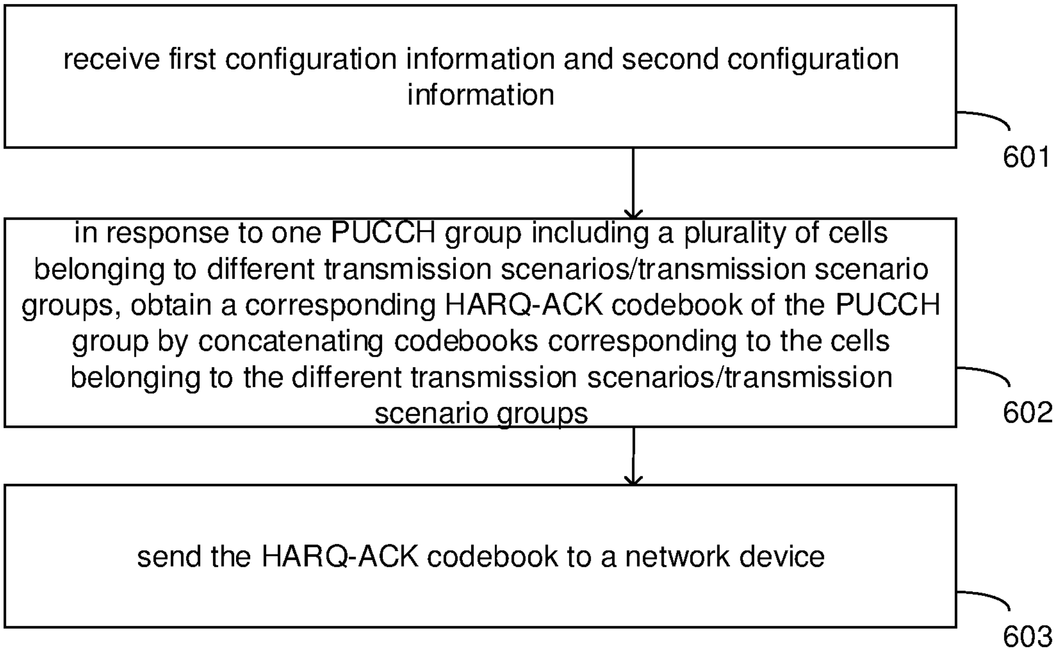
FIG. 6 is a flowchart illustrating a method for generating a HARQ-ACK codebook according to an embodiment.

Embodiments of the disclosure provide a method for generating a HARQ-ACK codebook, which is performed by a UE. The method may be executed independently or in combination with any other embodiment of the disclosure. FIG. 6 is a flowchart illustrating a method for generating a HARQ-ACK codebook according to an embodiment. As illustrated in FIG. 6, the method includes the following.

At block 601, first configuration information and second configuration information are received.

At block 602, in response to one PUCCH group including a plurality of cells belonging to different transmission scenarios, the HARQ-ACK codebook corresponding to the PUCCH group is obtained by concatenating codebooks corresponding to the cells belonging to different transmission scenarios; or in response to one PUCCH group including a plurality of cells belonging to different transmission scenario groups, the HARQ-ACK codebook corresponding to the PUCCH group is obtained by concatenating codebooks corresponding to the cells belonging to different transmission scenario groups.

At block 603, the HARQ-ACK codebook is sent to a network device.

The first configuration information indicates whether the multi-slot PDSCH transmission scheduled by a PDCCH is configured, and the second configuration information indicates whether the CBG transmission is configured.

In an implementation, the UE receives the first configuration information and the second configuration information. One PUCCH group includes a plurality of cells belonging to different transmission scenarios. For cells belonging to the same transmission scenario, the number of HARQ-ACK information bits corresponding to each DCI is determined, and the codebook for the cells belonging to the same transmission scenario is determined based on the number of the HARQ-ACK information bits. The HARQ-ACK codebook corresponding to the PUCCH group is obtained by concatenating the codebooks corresponding to the cells belonging to different transmission scenarios determined in the above manner, and sent to the network device.

In an implementation, the UE receives the first configuration information and the second configuration information. One PUCCH group includes a plurality of cells belonging to different transmission scenario groups. For cells belonging to the same transmission scenario group, the number of HARQ-ACK information bits corresponding to each DCI is determined, and the codebook for the cells belonging to the same transmission scenario group is determined based on the number of the HARQ-ACK information bits. The HARQ-ACK codebook corresponding to the PUCCH group is obtained by concatenating the codebooks corresponding to the cells belonging to different transmission scenario groups determined in the above manner, and sent to the network device.

In the above implementations, the UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

Moreover, generating the HARQ-ACK codebook based on the transmission scenario groups may reduce the number of HARQ-ACK information bits and improve the efficiency of feeding back the HARQ-ACK codebook.

Figure 7:
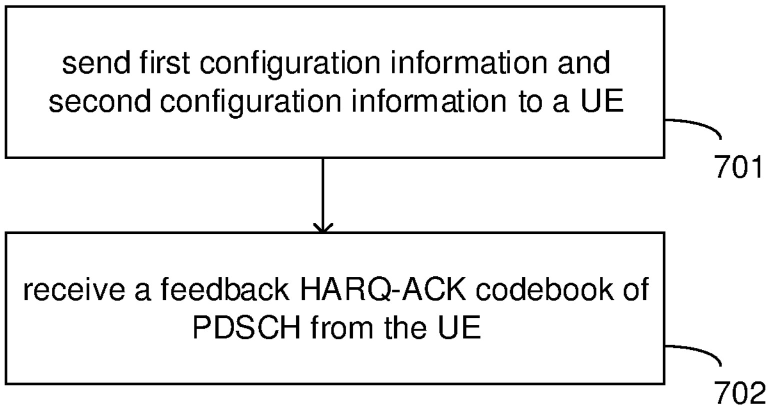
FIG. 7 is a flowchart illustrating a method for receiving a HARQ-ACK codebook according to an embodiment.

Embodiments of the disclosure provide a method for receiving a HARQ-ACK codebook, which is performed by a network device. The method may be executed independently or in combination with any other embodiment of the disclosure. FIG. 7 is a flowchart illustrating a method for receiving a HARQ-ACK codebook according to an embodiment. As illustrated in FIG. 7, the method includes the following.

At step 701, first configuration information and second configuration information are sent to a UE.

At step 702, a HARQ-ACK codebook for feeding back a PDSCH is received from the UE.

The first configuration information indicates whether the multi-slot PDSCH transmission scheduled by a PDCCH is configured, and the second configuration information indicates whether the CBG transmission is configured.

In an implementation, the network device sends the first configuration information and the second configuration information to the UE, so that the UE generates the HARQ-ACK codebook for feeding back the PDSCH(s) based on the received first configuration information and the received second configuration information, in which the first configuration information indicates whether the multi-slot PDSCH transmission scheduled by the PDCCH is configured, and the second configuration information indicates whether the CBG transmission is configured. The network device receives the HARQ-ACK codebook from the UE for accurate data retransmission.

In the above implementations, the network device sends the first configuration information and the second configuration information to the UE, so that the UE generates the HARQ-ACK codebook for feeding back the PDSCH(s) based on the first configuration information and the second configuration information. The HARQ-ACK codebook generated in this manner is suitable for fully taking into account the two configuration methods described above, thereby ensuring accurate and efficient data retransmission.

Figure 8:
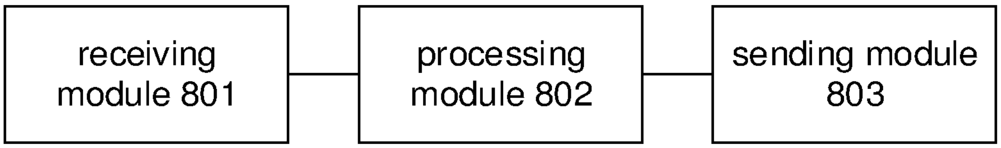
FIG. 8 is a block diagram illustrating an apparatus for generating a HARQ-ACK codebook according to an embodiment.

Embodiments of the disclosure provide an apparatus for generating a HARQ-ACK codebook, which is applied to a UE. As illustrated in FIG. 8, the apparatus includes:

a receiving module 801, configured to receive first configuration information and second configuration information;

a processing module 802, configured to generate, based on the first configuration information and the second configuration information, a HARQ-ACK codebook for feeding back a PDSCH; and a sending module 803, configured to send the HARQ-ACK codebook to a network device.

The first configuration information indicates whether a multi-slot PDSCH transmission scheduled by a PDCCH is configured, and the second configuration information indicates whether a CBG transmission is configured.

Figure 9:
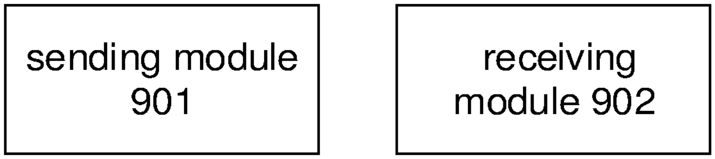
FIG. 9 is a block diagram illustrating an apparatus for receiving a HARQ-ACK codebook according to an embodiment.

Embodiments of the disclosure provide an apparatus for receiving a HARQ-ACK codebook, which is applied to a network device. As illustrated in FIG. 9, the apparatus includes:

a sending module 901, configured to send first configuration information and second configuration information to a UE; and a receiving module 902, configured to receive a HARQ-ACK codebook for feeding back a PDSCH from the UE.

The first configuration information indicates whether a multi-slot PDSCH transmission scheduled by a PDCCH is configured, and the second configuration information indicates whether a CBG transmission is configured.

Embodiments of the disclosure provide a mobile terminal. The mobile terminal includes:

a processor; and a memory for storing instructions executable by the processor;

in which, the processor is configured to execute executable instructions in the memory to implement steps of the above methods for generating a HARQ-ACK codebook.

Embodiments of the disclosure provide a network side device. The network side device includes:

a processor; and a memory for storing instructions executable by the processor;

in which the processor is configured to execute executable instructions in the memory to implement steps of the above methods for receiving a HARQ-ACK codebook.

Embodiments of the disclosure provide a non-transitory computer-readable storage medium having executable instructions stored thereon. When the executable instructions are executed by a processor, steps of the above methods for generating a HARQ-ACK codebook or steps of the above methods for receiving a HARQ-ACK codebook are implemented.

Figure 10:
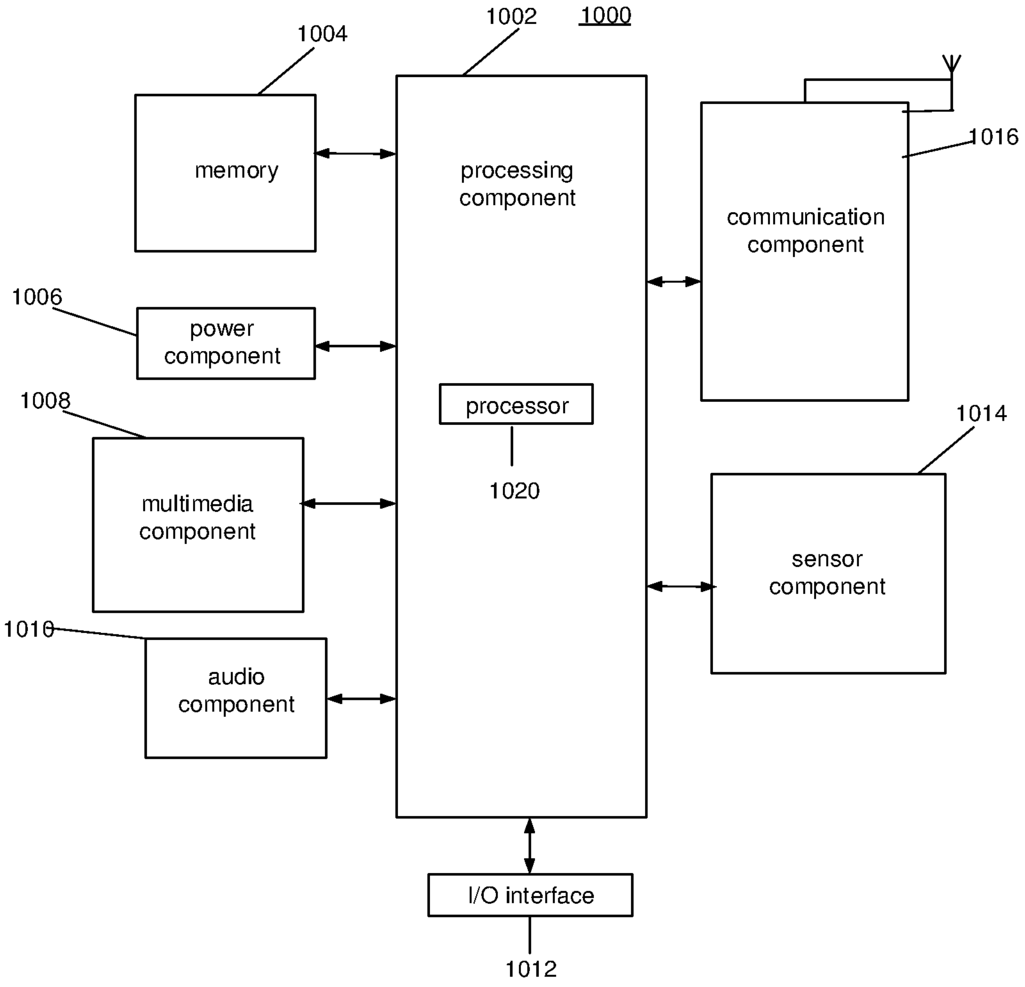
FIG. 10 is a schematic diagram illustrating a device for generating a HARQ-ACK codebook according to an embodiment.

FIG. 10 is a schematic diagram illustrating a device 1000 for generating a HARQ-ACK codebook according to an embodiment. For example, the device 1000 may be a mobile phone, a computer, a digital broadcasting terminal, a message transceiver device, a game console, a tablet device, a medical device, a fitness device and a personal digital assistant.

As illustrated in FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone call, data communication, camera operation, and recording operation. The processing component 1002 may include one or more processors 1020 to perform instructions to implement all or part of the steps in the above described methods. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, videos, etc. The memory 1004 may be implemented using any type of volatile or non-volatile memory devices, or a combination thereof, such as a static random-access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front-facing camera and/or a rear-facing camera. When the device 1000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1010 is configured to output and/or input audio signals. For example, the audio component 1010 includes a microphone (MIC) configured to receive an external audio signal when the device 1000 is in an operation mode, such as a calling mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of a user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a Complementary Metal Oxide Semiconductor (CMOS) or Charge-Coupled Device (CCD) image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WIFI, 2G or 3G, or a combination thereof. In an embodiment, the communication component 1016 receives a broadcast signal from an external broadcast management system or broadcast associated information via a broadcast channel. In an embodiment, the communication component 1016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In an embodiment, the device 1000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an embodiments, there is also provided a non-transitory computer readable storage medium including instructions, such as the memory 1004, executable by the processor 1020 in the device 1000, for implementing the above methods. For example, the non-transitory computer-readable storage medium may be a ROM, a Random Access Memory (RAM), a CD-ROM, a magnetic tape, a floppy disc, and an optical data storage device.

Figure 11:
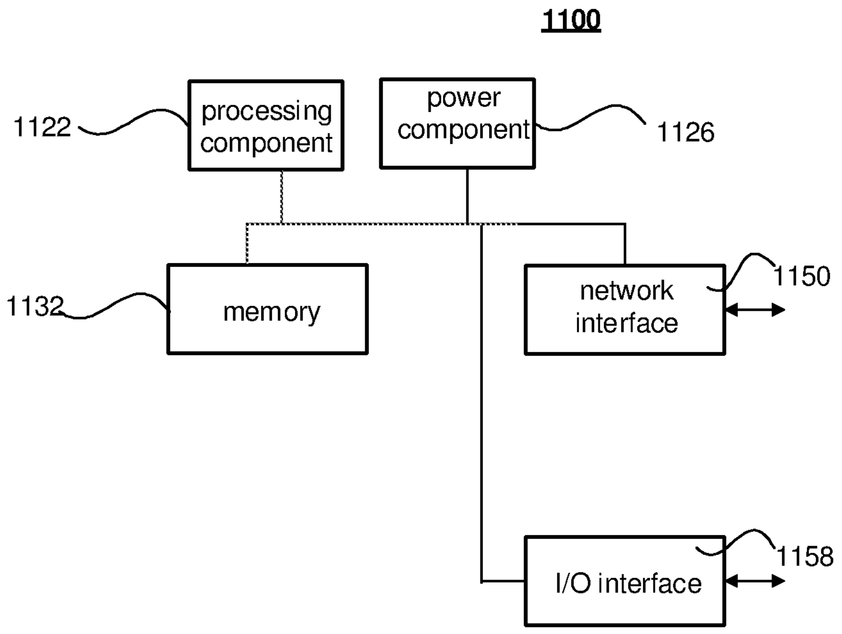
FIG. 11 is a schematic diagram illustrating a device for receiving a HARQ-ACK codebook according to an embodiment.

FIG. 11 is a schematic diagram illustrating a device 1100 for receiving a HARQ-ACK codebook according to an embodiment. For example, the device 1100 is provided as a base station. As illustrated in FIG. 11, the device 1100 includes a processing component 1122 consisting of one or more processors, and memory resources represented by a memory 1132 for storing instructions that may be executed by the processing component 1122, such as applications. The applications stored in the memory 1132 may include one or more modules each corresponding to a set of instructions. In addition, the processing component 1122 is configured to execute instructions to implement the above method.

The device 1100 may also include a power component 1126 configured to perform power management of the device 1100, a wired or wireless network interface 1150 configured to connect the device 1100 to a network, and an I/O interface 1158. The device 1100 may operate based on an operating system stored in the memory 1132, such as Windows Server™, Mac OS X™, Unix™, Linux™, FreeBSD™, or the like.

Other implementations of the disclosure will be apparent to those skilled in the art from consideration of the specification and practice of the disclosure disclosed here. This disclosure is intended to cover any variations, usages, or adaptations of the disclosure following the general principles thereof and including such departures from the disclosure as come within known or customary practice in the art. It is intended that the specification and examples are considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

INDUSTRIAL UTILITY

The UE generates the HARQ-ACK codebook for feeding back the PDSCH(s) based on the configuration method of the multi-slot PDSCH transmission scheduled by the PDCCH and the configuration method of the CBG transmission, so that the HARQ-ACK codebook is generated in a manner suitable for both of the configurations.

What is claimed is:

1. A method for generating a Hybrid Automatic Repeat Request Acknowledgement (HARQ-ACK) codebook, performed by a user equipment (UE), comprising:

receiving first configuration information and second configuration information;

generating, based on the first configuration information and the second configuration information, the HARQ-ACK codebook for feeding back a physical downlink shared channel (PDSCH); and sending the HARQ-ACK codebook to a network device;

wherein the first configuration information indicates whether a multi-slot PDSCH transmission scheduled by a physical downlink control channel (PDCCH) is configured, and the second configuration information indicates whether a code block group (CBG) transmission is configured;

wherein generating, based on the first configuration information and the second configuration information, the HARQ-ACK codebook for feeding back the PDSCH comprises:

determining, based on the first configuration information and the second configuration information, transmission scenario groups, each of the transmission scenario groups comprising at least one transmission scenario; and for cells belonging to the same transmission scenario group, determining that a number of HARQ-ACK information bits corresponding to each downlink control information (DCI) is a maximum number of HARQ-ACK information bits corresponding to each DCI in transmission scenarios comprised in the transmission scenario group:

wherein the transmission scenarios comprise: a first transmission scenario, a second transmission scenario, a third transmission scenario, and a fourth transmission scenario; the first transmission scenario is a transmission scenario in which the multi-slot PDSCH transmission scheduled by the PDCCH is not configured and the CBG transmission is not configured; the second transmission scenario is a transmission scenario in which the multi-slot PDSCH transmission scheduled by the PDCCH is not configured and the CBG transmission is configured; the third transmission scenario is a transmission scenario in which the multi-slot PDSCH transmission scheduled by the PDCCH is configured and the CBG transmission is not configured; and the fourth transmission scenario is a transmission scenario in which the multi-slot PDSCH transmission scheduled by the PDCCH is configured and the CBG transmission is configured;

the number of HARQ-ACK information bits corresponding to each DCI in the first transmission scenario is 1;

the number of HARQ-ACK information bits corresponding to each DCI in the second transmission scenario is M;

the number of HARQ-ACK information bits corresponding to each DCI in the third transmission scenario is N;

the number of HARQ-ACK information bits corresponding to each DCI in the fourth transmission scenario is M*N or a maximum value between M and N;

wherein M is a maximum number of CBGs comprised in one transport block configured by the network device, N is a maximum number of PDSCHs corresponding to the multi-slot PDSCH transmission scheduled by the PDCCH, the maximum number of PDSCHs is a maximum number of PDSCHs scheduled by DCI determined based on a configuration from the network device or a maximum number of PDSCHs scheduled by DCI determined based on a protocol; and M and N are both positive integers greater than 0.

2. The method of claim 1, wherein generating, based on the first configuration information and the second configuration information, the HARQ-ACK codebook for feeding back the PDSCH further comprises:

in response to the first configuration information indicating that the multi-slot PDSCH transmission scheduled by the PDCCH is configured and the second configuration information indicating that the CBG transmission is configured, determining that a number of HARQ-ACK information bits corresponding to each DCI is a maximum value between M and N.

3. The method of claim 2, wherein determining that the number of HARQ-ACK information bits corresponding to the DCI is the maximum value of M and N comprises one of:

in response to one DCI scheduling L PDSCHs, $L=1$ and $M\geq N$, determining that HARQ-ACK information corresponding to the DCI comprises M information bits corresponding to M CBGs of the PDSCH;

in response to one DCI scheduling L PDSCHs, $L=1$ and $M<N$, determining that the HARQ-ACK information corresponding to the DCI comprises M information bits corresponding to M CBGs of the PDSCH and $(N-M)$ stuffing bits, values of the $(N-M)$ stuffing bits being identical;

in response to one DCI scheduling L PDSCHs, $1<L\leq N$ and $M\geq N$, determining that the HARQ-ACK information corresponding to the DCI comprises L information bits corresponding to the L PDSCHs and $(M-L)$ stuffing bits, values of the $(M-L)$ stuffing bits being identical; or in response to one DCI scheduling L PDSCHs, $1<L\leq N$ and $M<N$, determining that the HARQ-ACK information corresponding to the DCI comprises L information bits corresponding to the L PDSCHs and (N−L) stuffing bits, values of the (N−L) stuffing bits being identical;

wherein L is a positive integer greater than 0.

4. The method of claim 1, wherein generating, based on the first configuration information and the second configuration information, the HARQ-ACK codebook for feeding back the PDSCH comprises:

in response to one physical uplink control channel (PUCCH) group comprising a plurality of cells belonging to different transmission scenarios, obtaining the HARQ-ACK codebook corresponding to the PUCCH group by concatenating codebooks corresponding to the cells belonging to different transmission scenarios; or in response to one PUCCH group comprising a plurality of cells belonging to different transmission scenario groups, obtaining the HARQ-ACK codebook corresponding to the PUCCH group by concatenating codebooks corresponding to the cells belonging to different transmission scenario groups.

5. A method for receiving a Hybrid Automatic Repeat Request Acknowledgement (HARQ-ACK) codebook, performed by a network device, comprising:

sending first configuration information and second configuration information to a user equipment (UE); and receiving the HARQ-ACK codebook for feeding back a physical downlink shared channel (PDSCH) from the UE;

wherein the first configuration information indicates whether a multi-slot PDSCH transmission scheduled by a physical downlink control channel (PDCCH) is configured, and the second configuration information indicates whether a code block group (CBG) transmission is configured;

wherein the HARQ-ACK codebook is generated based on transmission scenario groups determined based on the first configuration information and the second configuration information, and each of the transmission scenario groups comprises at least one transmission scenario;

wherein for cells belonging to the same transmission scenario group, a number of HARQ-ACK information bits corresponding to each downlink control information (DCI) is a maximum number of HARQ-ACK information bits corresponding to each DCI in transmission scenarios comprised in the transmission scenario group;

wherein the transmission scenarios comprise: a first transmission scenario, a second transmission scenario, a third transmission scenario, and a fourth transmission scenario; the first transmission scenario is a transmission scenario in which the multi-slot PDSCH transmission scheduled by the PDCCH is not configured and the CBG transmission is not configured; the second transmission scenario is a transmission scenario in which the multi-slot PDSCH transmission scheduled by the PDCCH is not configured and the CBG transmission is configured; the third transmission scenario is a transmission scenario in which the multi-slot PDSCH transmission scheduled by the PDCCH is configured and the CBG transmission is not configured; and the fourth transmission scenario is a transmission scenario in which the multi-slot PDSCH transmission scheduled by the PDCCH is configured and the CBG transmission is configured;

the number of HARQ-ACK information bits corresponding to each DCI in the first transmission scenario is 1;

the number of HARQ-ACK information bits corresponding to each DCI in the second transmission scenario is M;

the number of HARQ-ACK information bits corresponding to each DCI in the third transmission scenario is N;

the number of HARQ-ACK information bits corresponding to each DCI in the fourth transmission scenario is M*N or a maximum value between M and N;

wherein M is a maximum number of CBGs comprised in one transport block configured by the network device, N is a maximum number of PDSCHs corresponding to the multi-slot PDSCH transmission scheduled by the PDCCH, the maximum number of PDSCHs is a maximum number of PDSCHs scheduled by DCI determined based on a configuration from the network device or a maximum number of PDSCHs scheduled by DCI determined based on a protocol; and M and N are both positive integers greater than 0.

6. The method of claim 5, wherein in response to the first configuration information indicating that the multi-slot PDSCH transmission scheduled by the PDCCH is configured and the second configuration information indicating that the CBG transmission is configured, a number of HARQ-ACK information bits corresponding to each DCI is a maximum value between M and N.

7. The method of claim 6, wherein, in response to one DCI scheduling L PDSCHs, L=1 and M≥N, HARQ-ACK information corresponding to the DCI comprises M information bits corresponding to M CBGs of the PDSCH;

in response to one DCI scheduling L PDSCHs, L=1 and M<N, the HARQ-ACK information corresponding to the DCI comprises M information bits corresponding to M CBGs of the PDSCH and (N−M) stuffing bits, values of the (N−M) stuffing bits being identical;

in response to one DCI scheduling L PDSCHs, 1<L≤N and M≥N, the HARQ-ACK information corresponding to the DCI comprises L information bits corresponding to the L PDSCHs and (M−L) stuffing bits, values of the (M−L) stuffing bits being identical; or in response to one DCI scheduling L PDSCHs, 1<L≤N and M<N, the HARQ-ACK information corresponding to the DCI comprises L information bits corresponding to the L PDSCHs and (N−L) stuffing bits, values of the (N−L) stuffing bits being identical;

wherein L is a positive integer greater than 0.

8. The method of claim 5, wherein in response to one physical uplink control channel (PUCCH) group comprising a plurality of cells belonging to different transmission scenarios, the HARQ-ACK codebook corresponding to the PUCCH group is obtained by concatenating codebooks corresponding to the cells belonging to different transmission scenarios; or in response to one PUCCH group comprising a plurality of cells belonging to different transmission scenario groups, the HARQ-ACK codebook corresponding to the PUCCH group is obtained by concatenating codebooks corresponding to the cells belonging to different transmission scenario groups.

9. A user equipment, comprising:

a processor; and a memory for storing instructions executable by the processor;

wherein the processor is configured to:

receive first configuration information and second configuration information;

generate, based on the first configuration information and the second configuration information, a Hybrid Automatic Repeat Request Acknowledgement (HARQ-ACK) codebook for feeding back a physical downlink shared channel (PDSCH); and send the HARQ-ACK codebook to a network device;

wherein the first configuration information indicates whether a multi-slot PDSCH transmission scheduled by a physical downlink control channel (PDCCH) is configured, and the second configuration information indicates whether a code block group (CBG) transmission is configured;

the processor is further configured to:

determine, based on the first configuration information and the second configuration information, transmission scenario groups, each of the transmission scenario groups comprising at least one transmission scenario; and for cells belonging to the same transmission scenario group, determine that a number of HARQ-ACK information bits corresponding to each downlink control information (DCI) is a maximum number of HARQ-ACK information bits corresponding to each DCI in transmission scenarios comprised in the transmission scenario group;

wherein the transmission scenarios comprise: a first transmission scenario, a second transmission scenario, a third transmission scenario, and a fourth transmission scenario; the first transmission scenario is a transmission scenario in which the multi-slot PDSCH transmission scheduled by the PDCCH is not configured and the CBG transmission is not configured; the second transmission scenario is a transmission scenario in which the multi-slot PDSCH transmission scheduled by the PDCCH is not configured and the CBG transmission is configured; the third transmission scenario is a transmission scenario in which the multi-slot PDSCH transmission scheduled by the PDCCH is configured and the CBG transmission is not configured; and the fourth transmission scenario is a transmission scenario in which the multi-slot PDSCH transmission scheduled by the PDCCH is configured and the CBG transmission is configured;

the number of HARQ-ACK information bits corresponding to each DCI in the first transmission scenario is 1;

the number of HARQ-ACK information bits corresponding to each DCI in the second transmission scenario is M;

the number of HARQ-ACK information bits corresponding to each DCI in the third transmission scenario is N;

the number of HARQ-ACK information bits corresponding to each DCI in the fourth transmission scenario is M*N or a maximum value between M and N;

wherein M is a maximum number of CBGs comprised in one transport block configured by the network device, N is a maximum number of PDSCHs corresponding to the multi-slot PDSCH transmission scheduled by the PDCCH, the maximum number of PDSCHs is a maximum number of PDSCHs scheduled by DCI determined based on a configuration from the network device or a maximum number of PDSCHs scheduled by DCI determined based on a protocol; and M and N are both positive integers greater than 0.

10. The user equipment of claim 9, wherein the processor is further configured to:

in response to the first configuration information indicating that the multi-slot PDSCH transmission scheduled by the PDCCH is configured and the second configuration information indicating that the CBG transmission is configured, determine that the number of HARQ-ACK information bits corresponding to each DCI is a maximum value between M and N.

11. The user equipment of claim 10, wherein the processor is further configured to:

in response to one DCI scheduling L PDSCHs, $L=1$ and $M \geq N$, determine that HARQ-ACK information corresponding to the DCI comprises M information bits corresponding to M CBGs of the PDSCH;

in response to one DCI scheduling L PDSCHs, $L=1$ and $M<N$, determine that the HARQ-ACK information corresponding to the DCI comprises M information bits corresponding to M CBGs of the PDSCH and $(N-M)$ stuffing bits, values of the $(N-M)$ stuffing bits being identical;

in response to one DCI scheduling L PDSCHs, $1<L \leq N$ and $M \geq N$, determine that the HARQ-ACK information corresponding to the DCI comprises L information bits corresponding to the L PDSCHs and $(M-L)$ stuffing bits, values of the $(M-L)$ stuffing bits being identical; or in response to one DCI scheduling L PDSCHs, $1<L \leq N$ and $M<N$, determine that the HARQ-ACK information corresponding to the DCI comprises L information bits corresponding to the L PDSCHs and $(N-L)$ stuffing bits, values of the $(N-L)$ stuffing bits being identical;

wherein L is a positive integer greater than 0.

12. A network device, comprising:

a processor; and a memory for storing instructions executable by the processor;

wherein the processor is configured to perform the method of claim 5.

13. A non-transitory computer-readable storage medium, having executable instructions stored thereon, wherein when the executable instructions are executed by a processor, the processor is caused to perform the method of claim 1.

14. A non-transitory computer-readable storage medium, having executable instructions stored thereon, wherein when the executable instructions are executed by a processor, the processor is caused to perform the method of claim 5.

* * * * *